US007693820B2

(12) United States Patent
Larson et al.

(10) Patent No.: US 7,693,820 B2
(45) Date of Patent: Apr. 6, 2010

(54) USE OF MATERIALIZED TRANSIENT VIEWS IN QUERY OPTIMIZATION

(75) Inventors: Per-Ake Larson, Redmond, WA (US); Jingren Zhou, Bellvue, WA (US)

(73) Assignee: Microsoft Corporation, Redmond, WA (US)

( * ) Notice: Subject to any disclaimer, the term of this patent is extended or adjusted under 35 U.S.C. 154(b) by 367 days.

(21) Appl. No.: 11/409,341

(22) Filed: Apr. 21, 2006

(65) Prior Publication Data

US 2007/0250473 A1 Oct. 25, 2007

(51) Int. Cl.
G06F 7/00 (2006.01)
G06F 17/00 (2006.01)
G06F 17/30 (2006.01)

(52) U.S. Cl. .......................................... 707/2; 707/102
(58) Field of Classification Search .................. 707/2, 707/102
See application file for complete search history.

(56) References Cited

U.S. PATENT DOCUMENTS

| | | | | |
|---|---|---|---|---|
| 6,275,818 | B1* | 8/2001 | Subramanian et al. | 707/2 |
| 6,366,903 | B1* | 4/2002 | Agrawal et al. | 707/2 |
| 6,510,422 | B1* | 1/2003 | Galindo-Legaria et al. | 707/2 |
| 7,089,225 | B2* | 8/2006 | Li et al. | 707/2 |
| 7,191,169 | B1* | 3/2007 | Tao | 707/2 |
| 7,467,127 | B1* | 12/2008 | Baccash et al. | 707/2 |
| 2003/0093415 | A1* | 5/2003 | Larson et al. | 707/3 |
| 2004/0122804 | A1* | 6/2004 | Zhang et al. | 707/3 |
| 2004/0153448 | A1* | 8/2004 | Cheng et al. | 707/4 |
| 2005/0114307 | A1* | 5/2005 | Li et al. | 707/3 |
| 2006/0230017 | A1* | 10/2006 | Larson et al. | 707/2 |
| 2007/0067261 | A1* | 3/2007 | Burger et al. | 707/2 |
| 2007/0083489 | A1* | 4/2007 | Lawande | 707/2 |

OTHER PUBLICATIONS

Ahuja et al, "Dynamic Data Dissemination Using Multi-Query Optimization in Distributed Databases", 2004, available online: http://www.cs.ucsc.edu/~gaurav/Project/Publications/Undergrad_project_report.pdf.*

Index of /~gaurav/Project/Publications, showing date of reference U.*

Bender, Michael A., et al.,"The LCA Problem Revisited", http://www.ics.uci.edu/~eppstein/261/BenFar-LCA-00.pdf, (2001).

Madden, Samuel,"Continuously Adaptive Continuous Queries over Streams", http://db.cs.berkeley.edu/papers/sigmod02-cacq.pdf, (2002).

Lehner, Wolfgang, "fAST Refresh using Mass Query Optimization", (2001) http://csdl2.computer.org/persagen/DLAbsToc.jsp?resourcePath=/dl/proceedings/&toc=comp/proceedings/icde/2001/1001/00/1001toc.xml&DOI=10.1109/ICDE.2001.914852, (2001).

(Continued)

*Primary Examiner*—Yicun Wu
*Assistant Examiner*—Brannon W Smith (57) ABSTRACT

Methods and systems for integrating use of materialized transient views into generation of an optimized query execution plan. Features and aspects hereof provide rapid identification of common expressions in a query as transient view candidates and then rapidly select among the transient view candidates for those transient views that most benefit the cost of execution of the query. The selected transient views are incorporated into a generated final, optimized query execution plan including operator to materialize the selected transient views for re-use in execution of the query.

12 Claims, 5 Drawing Sheets

OTHER PUBLICATIONS

Trigoni, Niki, "Multi-query Optimization for Sensor Networks", http://www.dcs.bbk.ac.uk/~niki/MQO.pdf, (2005).

Readings in Database Systems, 3rd Edition,Stonebraker & Hellerstein, eds.,"SQL Query Optimization",http://redbook.cs.berkeley.edu/redbook3/lec7.html, (1998).

Rosenthal, Arnon, "Anatomy of a Modular Multiple Query Optimizer", http://www.vldb.org/conf/1988/P230.PDF, (1988).

Agrawal, Sanjay,"Automated Selection of Materialized Views and Indexes for SQL Databases",http://www.cs.brown.edu/courses/cs227/Papers/AutoAdmin/vldb00.pdf, (2000).

Dehaan, David et al.,"Stacked indexed views in microsoft SQL server", http://portal.acm.org/citation.cfm?id=1066179&dl=ACM&coll=ACM, (2005).

Finkelstein, Sheldon,"Common expression analysis in database applications", http://portal.acm.org/citation.cfm?id=582400&dl=ACM&coll=portal, (1982).

Roy,Prasan, et al,"Efficient and Extensible Algorithms for Multi Query Optimization",http://www.cse.iitb.ac.in/~sudarsha/Pubs-dir/mqo-sigmod00.pdf, (2000).

Mistry,Hoshi, et al,"Materialized View Selection and Maintenance Using Multi-Query Optimization", http://www.cse.iitb.ac.in/~krithi/papers/sigmod2001_viewmaint.pdf, (2001).

Sellis,Timos K. ,"Multiple-query optimization",http://portal.acm.org/citation.cfm?id=42203&dl=ACM&coll=ACM, (1988).

Dalvi,Nilesh N., et al,"Pipelining in Multi-Query Optimization", http://www.sigmod.org/sigmod/pods/proc01/online/p49.pdf, (2001).

Subramanian,Subbu N., et al,"Cost-based optimization of decision support queries using transient-views",http://portal.acm.org/citation.cfm?id=276333&dl=ACM&coll=portal, (1998).

Goldstein,Jonathan, et al,"Optimizing Queries Using Materialized Views:. A Practical, Scalable Solution",http://research.microsoft.com/users/iongold/ViewMatchingSigmod2001.pdf, (2001).

Kenneth,Ross A., et al,"Materialized view maintenance and integrity constraint checking: trading space for time",http://portal.acm.org/citation.cfm?id=233361&dl=ACM&coll=GUIDE, (1996).

Graefe,Goetz, et al,"MS SQL Server 7.0 Query Processor",http://msdn.microsoft.com/library/default.asp?url=/library/en-us/dnsql7/html/queryproc.asp, (1998).

Colby,Latha S., et al,"Red Brick Vista : Aggregate Computation and Management", (1998) http://csdl2.computer.org/persagen/DLAbsToc.jsp?resourcePath=/dl/proceedings/&toc=comp/proceedings/icde/1998/8289/00/8289toc.xml&DOI=10.1109/ICDE.1998.655773, (1998).

Berenson,Hal, et al,"Microsoft SQL Server Query Processor Internals and Architecture", http://msdn.mirosoft.com/library/en-us/dnsql7/html/sqlqerproc.asp?frame=true, (2000).

Graefe,Goetz,"The Cascades Framework for Query Optimization", (1995).

Park,Jooseok, et al,"Using Common Subexpressions to Optimize Multiple Queries",http://portal.acm.org/citation.cfm?coll=GUIDE&dl=GUIDE&id=653403, (1998).

Rao,Jun, et al,"Reusing Invariants: A New Strategy for Correlated Queries", (1998).

* cited by examiner

USE OF MATERIALIZED TRANSIENT VIEWS IN QUERY OPTIMIZATION

BACKGROUND

A database is generally a collection of related records of data, each record containing one or more fields of data. The data structure is combined with a set of operations to search the data, sort the data, add/modify/delete the data, and other data management and manipulation functions. The search function of a database is often implemented through a tool (e.g., a user interface or application program interface) that permits construction of a query to access the database. In relational databases, the data is usually represented as one or more tables of such records. The tables are related and/or indexed by identified fields (e.g., by "keys" or "key fields"). Tables may be joined with other tables—typically through use of related fields in records in each table. A join of two or more tables also represents a view of the joined information. Records may be selected from one or more tables or views based on values of particular fields of records of the tables (e.g., by key field values or non-key field values). Such a selection operation also represents a view of the records so selected. In other words, operations such as select, project, join, and group may be performed on one or more tables and/or views. Expressions may be formed from such operations on one or more tables and/or views.

Structured query language ("SQL") has evolved in the industry as a widely accepted, de-facto standard for expressing queries against data in relational databases. SQL expresses a database query as a number of expressions applying operations to one or more tables and/or views of the data in the database. Some expressions may determine which records are to be selected from one or more tables and/or views. Some expressions may represent join operations to be performed among a plurality of tables and/or views of the database. Still other expressions may define how the selected records are to be grouped in a results table generated by executing the SQL query. The rich set of features in SQL is generally well known to those of ordinary skill in the art.

A query expressed in SQL is generally compiled from a first syntactic form into an internal representation of the various expressions and operations to be performed within those expressions. Each expression may represent one or more operations to be performed on one or more table and/or view in the database. The query so compiled into an internal form is often referred to as a query plan. The query plan is essentially an ordered set of steps to evaluate the various expressions of the query.

In large database applications, elapsed time to execute a query (e.g., to perform the steps of a query plan) can be critical. For example, large databases storing consumer product/account information required for customer service needs to be accessed quickly enough to satisfy customer expectations for rapid service and response. To speed execution of a query, it is common in SQL query processing systems that a query plan is analyzed by a query optimizer to look for enhancements that may speed execution of the query plan. Present query optimization techniques attempt to analyze the query to determine an optimal order for executing the query (e.g., order of executing the steps of the query plan). By analyzing the order in which expressions are evaluated and potentially re-ordering the expression evaluation execution, significant improvements in query execution elapsed time may be achieved. In particular, a query optimizer may analyze the expressions of a query to identify common expressions used multiple times within a complex query. The expressions in the complex query may then be evaluated in an order that optimizes re-use of previously evaluated expressions so as to avoid the processing needed to re-evaluate the same, common, shared expression multiple times.

Academic and industry research has studied issues of query optimization techniques that exploit recognition and re-use of common, shared expressions. However, no commercial SQL query processing systems yet perform such optimization relating to recognition and re-use of common, shared expressions to speed up query execution. The principal reason for this lack of commercial success may be that current optimization techniques that recognize and re-use common, shared expressions are impractical for large, complex queries potentially having a large number of common, shared expressions. Present optimization techniques require significant processing time to recognize common, shared expressions and to evaluate the benefits of re-use of each of a large number of common, shared expressions to determine which common, shared expressions may realize the most benefit to the overall query execution. This processing time can be so significant as to reduce or totally eliminate the potential benefit of the resulting optimization. In other words, the elapsed time to identify and effectuate re-use of common, shared expressions in a complex query may exceed any savings realized by enacting the identified optimizations.

Where multiple related queries are executed on a common database, the problems of costs to identify and evaluate potential optimization are exacerbated. There are proportionately more opportunities to identify common shared expressions among the plurality of queries. In view of the increased complexity of such multiple queries, the benefits potentially realized by optimizations to identify and re-use common, shared expressions are larger but so too is the complexity of processing to identify and determine the best choice of common, shared expressions to exploit in the query plan. As noted above, the cost of identifying and selecting among numerous alternative common, shared expressions in a complex plurality of related queries may reduce or eliminate the benefits of enacting such optimizations.

It is evident from the above discussion that it is an ongoing problem to efficiently and effectively identify possible common, shared expressions among a plurality of queries and to effectuate re-use of the identified common, shared expressions so as to reduce the total elapsed time to execute a query or a plurality of queries.

SUMMARY

The present invention solves the above and other problems, thereby advancing the state of the useful arts, by providing apparatus and methods for optimizing query execution by inclusion of materialized transient views. Features and aspects hereof provide methods and systems for optimizing execution of a database query. One exemplary method includes identifying potentially sharable expressions in a query and designing covering transient view candidates. The method then selects among the identified transient view candidates those that are estimated to provide the greatest reduction in total query execution time. An optimized query execution plan is then generated including the selected transient view candidates and including operators to materialize the selected transient view candidates for re-use during execution of the optimized query execution plan. The selection of transient view candidates may include heuristic rules to rapidly identify transient views unlikely to produce any meaningful benefit in execution of the query. The selection may also include rules applied during cost-based optimization that rapidly select those transient views that provide the most cost benefit in executing the query.

DETAILED DESCRIPTION

Figure 1:
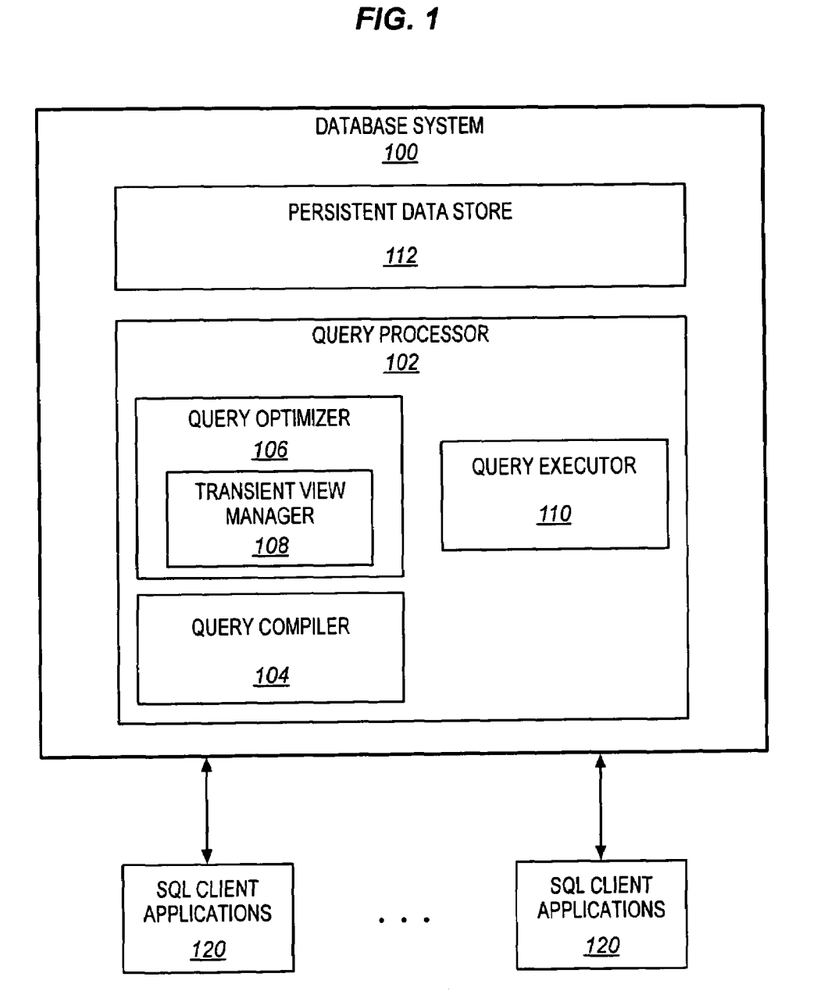
FIG. 1 is a block diagram of an exemplary SQL server system enhanced in accordance with features and aspects hereof to incorporate materialized transient views in the query optimization processing.

FIG. 1 is a block diagram of a relational database system 100 that stores and retrieves information on a persistent data store 112. Database system 100 embodies features and aspects hereof to improve query optimization by efficiently utilizing transient view materialization. A transient (materialized) view is defined by a query expression and it is "materialized" when its result is stored for some duration of time. A transient view, in general, is an expression representing an intermediate stage in the execution of a query. As presently practiced in the art, such intermediate results are not generally stored (materialized) for re-use within execution of a complex query or set of queries because present query optimization techniques do not make practical, effective use of such stored or materialized transient views.

By contrast, database system 100 of FIG. 1 includes query processor 102 that incorporates features and aspects hereof to optimize queries effectively utilizing transient views to better optimize the execution of received queries. Database system 100 generally receives queries from one or more SQL client applications 120. Database system 100 may run on any suitable computing system such as a personal computer or workstation as well as a distributed network of computing systems. In like manner, SQL client applications 120 may represent individual computing systems such as personal computers and workstations coupled through a network to database system 100. Further client applications 120 may simply represent client processes operable on the same computing system as the database system 100. Numerous such computing system topologies and distributed computing structures will be readily apparent to those of ordinary skill in the art. The client applications 120 and server process 100 are shown in FIG. 1 as separate processes or computing systems operable in accordance with well known client/server computing paradigms. However, those of ordinary skill in the art will also readily understand that features and aspects hereof may be equivalently implemented within a single integrated computing system not dependent upon client/server computing models or network features.

Query compiler 104 within query processor 102 generally translates the received query from a user or application oriented syntax into an internal representation for more effective manipulation and compact storage. For example, a query may be represented by an operator tree structure wherein each node of the tree represents either an operation to be performed or a source table of the underlying database (e.g., a leaf node of the operator tree). The root of such an operator tree represents the complete query including all operations and expressions specified therein. Deeper nodes of the operator tree then represent subexpressions of the query—each composing a part of the overall query.

Query optimizer 106 may receive such a compiled, internal representation of a received query from query compiler 104. Query optimizer 106 then processes the compiled, received query/queries to determine an optimized query execution plan. In general, query optimizer 106 transforms the query as represented by the operator tree in a number of ways to generate multiple alternative execution plans and selects the alternative estimated to have the shortest overall execution time. Transformations generated by a query optimizer may include, for example, re-ordering of select, join, project, and group operators (as well as other operators in the operator tree) to reduce execution time required for evaluating the ultimate query. In addition, in accordance with features and aspects hereof, query optimizer 106 efficiently detects similar subexpressions in the query to allow effective utilization of materialized transient views. Where prior techniques to detect and exploit similar subexpressions in query optimization have been too compute intensive to be of practical use, features and aspects hereof provide an efficient mechanism for detecting similar expressions within the query and for integrating use of transient views into cost-based query optimizations.

In general, query optimizer 106 detects similar expressions within a query to be optimized and manages information regarding such detected expressions in cooperation with the transient view manager 108. Query optimizer 106 is operable to detect similar expressions within one or more received queries. Query optimizer 106 first optimizes the query or queries in its regular manner. For each expression generated during regular optimization, a table signature information structure is computed to represent the expression. Expressions that may be similar to other expressions within the queries, and therefore potentially sharable, will share the same table signature value. The table signature information generated by the query optimizer 106 is communicated to (registered within) the transient view manager 108 for storage during operation of query optimizer 106. The transient view manager 108 may store/register the table signature information in an efficiently accessible data structure such as a hash table or other indexed data structures allowing rapid access to the stored/registered table signature information.

After the query optimizer has completed regular optimization, transient view manager 108 inspects the registered table signatures to identify potentially sharable expressions. Expressions from different part of a query or from different queries that have the same table signature are potentially sharable. For each set of potentially sharable expressions found, transient view manager 108 may then generate a number of transient view candidates. During this process, transient view manager 108 may apply a variety of heuristic rules to reduce the number of transient view candidates that need be considered for possible further optimization.

For very simple queries, the optimizer may recognize a threshold level of complexity in the compiled query and may skip consideration of transient views in optimizing the query and immediately generate a query execution plan. Also, if there are no potentially sharable expressions detected further optimization considering transient views is not required. Or, if it is clear that the simple query can be executed without any optimization (e.g., because the source tables are all small), then spending any processing time to try and optimize such a simple query may be a waste. A query that only requires, for example, a fraction of second to process without optimizations is not worthy of any processing time to determine potential for savings from re-use of materialized transient views. Such a threshold value may be determined in accordance with the needs of a particular application and could be programmable parameters of the database system 100.

If, following this pruning of transient view candidates by application of one or more heuristic rules, at least one transient view candidate remains, query optimizer 106 resumes query optimization to determine which, if any, of the remaining transient view candidates are most beneficial to include in the final, optimized query execution plan. Each of the remaining transient views following pruning may or may not be selected for inclusion in the final, optimized query execution plan. Query optimizer 106 decides whether to use a particular transient view by applying well-known cost-based optimization techniques. The cost-based optimization techniques utilize costing information associated with each transient view to select which transient views should be materialized for maximum benefit in the final, optimized query execution plan. As noted above, some expressions may require more processing time to compute the result from a shared transient view than to compute it in other ways. A transient view serving such shared expressions would therefore not be an appropriate candidate for materializing. The cost-based optimization process used by query optimizer 106 can thereby detect which (if any) transient view candidates will most benefit performance of the final, optimized query execution plan. Further, where multiple transient view candidates are available for consideration, query optimizer 106 may partially re-optimize the queries multiple times to evaluate the effect of different subsets of transient view candidates. Rather than evaluating all possible subsets of transient view candidates, processing in accordance with features and aspects hereof also limits the number of subsets of transient view candidates that need be considered to determine the final, optimized query execution plan.

Having so determined the final, optimized query execution plan, query executor 110 is operable to execute the final, optimized query execution plan. During execution of the plan, the selected transient views are materialized and their results reused to compute each view's target expressions, thereby improving performance of the query execution. The selected transient views candidates to be materialized may be materialized utilizing an appropriate operation for the underlying database system 100. For example, in Microsoft's SQL server product family, a "spool" operator is added to an expression representing a transient view to be materialized during execution. The spool operator in Microsoft's SQL server stores the result of an expression in internal, temporary work tables. The retained result may then be accessed subsequently when computing other expressions. The internal work table is automatically discarded when execution of the query terminates.

Those of ordinary skill in the art will recognize a variety of other elements useful and/or required in a fully functional database system 100 and/or associated SQL client applications 120. Such other elements are well known to those of ordinary skill in the art and are eliminated in FIG. 1 simply for brevity of this description. Further, those of ordinary skill in the art will recognize that functional elements within query processor 102 may be separated or integrated differently as a matter of design choice. The particular functional decomposition of query processor 102 as shown in FIG. 1 is intended merely as suggestive of typical functional elements within the query processor 102 enhanced in accordance with features and aspects hereof. A variety of equivalent system structures will be readily apparent to those of ordinary skill in the art to provide functions to implement features and aspects hereof relating to use of materialized transient views in a query optimization.

Figure 2:
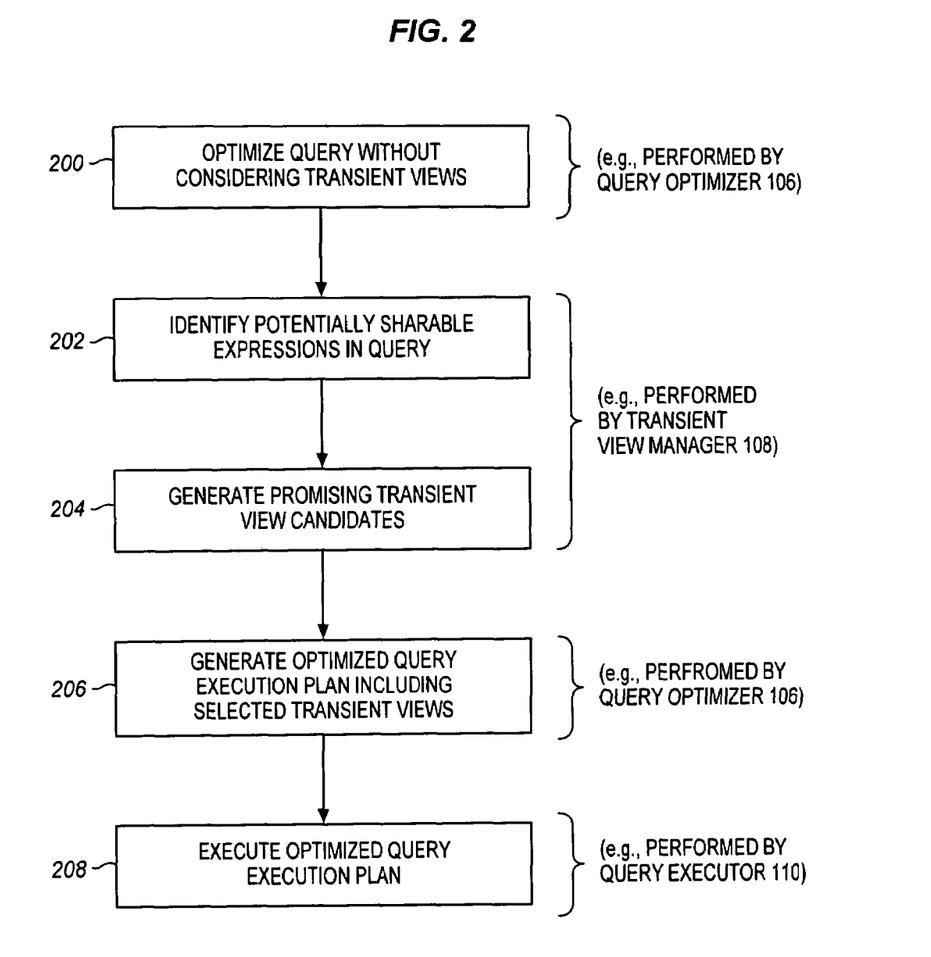
FIG. 2 is a flowchart describing an exemplary method in accordance with features and aspects hereof to incorporate materialized transient views in generation of an optimized query execution plan.

FIGS. 2 through 5 are flowcharts describing exemplary methods in accordance with features and aspects hereof to utilize materialized transient views for purposes of optimizing one or more SQL queries. In particular, FIG. 2 exemplifies operation of a query processor including query optimization utilizing materialized transient views in accordance with features and aspects hereof to improve performance of one or more SQL queries. Element 200 in FIG. 2 represents the normal optimization of a received query or queries performed by the query optimizer without consideration of transient views. Element 202 of FIG. 2 is operable to identify sets of similar subexpressions in the queries. Each identified set of similar expressions may represent an opportunity to improve performance of execution of the queries by creating one or more transient views covering the expressions in the set. If one or more such sharing opportunities are identified, Element 204 is then operable to generate possible candidate transient views and, optionally, pruning out candidates whose benefit is likely to be small by applying heuristic rules. The result of this step is a set of promising candidate transient views. Element 204 may include application of a variety of heuristic rules and cost-based optimization rules to remove some candidate transient views from further consideration. Further details of such heuristic rules and cost-based optimization functions are discussed further herein below.

Having so generated and selected the most promising transient view candidates to materialize during query execution, element 206 is operable to generate the final, optimized query execution plan including some, all or none of the selected transient views to the materialized. In general, element 206 represents processing of the cost-based query optimizer utilizing estimated cost information of transient views and other expressions to determine the lowest-cost query execution plan. Lastly, element 208 represents processing to actually execute the final, optimized query execution plan, including materialization of one or more transient views as determined by the generation of the optimized query execution plan by element 206. By materializing one or more transient views during execution of the query execution plan, the materialized result of a transient view may be re-used for computing the result of multiple subexpressions contained in the query. This reduces query execution time by avoiding repeated execution of the same or similar subexpressions multiple times. Initial costs (including computation and materialization (e.g., writing costs) for each materialized transient view are incurred once and shared over all other uses of the underlying shared expression.

Those of ordinary skill in the art will recognize that normal cost-based query optimization may be performed in conjunction with the method of FIG. 2. In particular, a standard cost-based optimization may be performed to identify a default optimized query execution plan if the further optimization with transient view candidates provides no further benefit. Standard cost-based query optimization may process such matters as modifying the order or types of operators to be performed in the operator tree. Non-indexed operations could be replaced by indexed operations. Join operations may be replaced by faster join operations based on the characteristics of the tables/views to be joined. Numerous such standard cost-based optimizations are well known to those of ordinary skill in the art.

Figure 3:
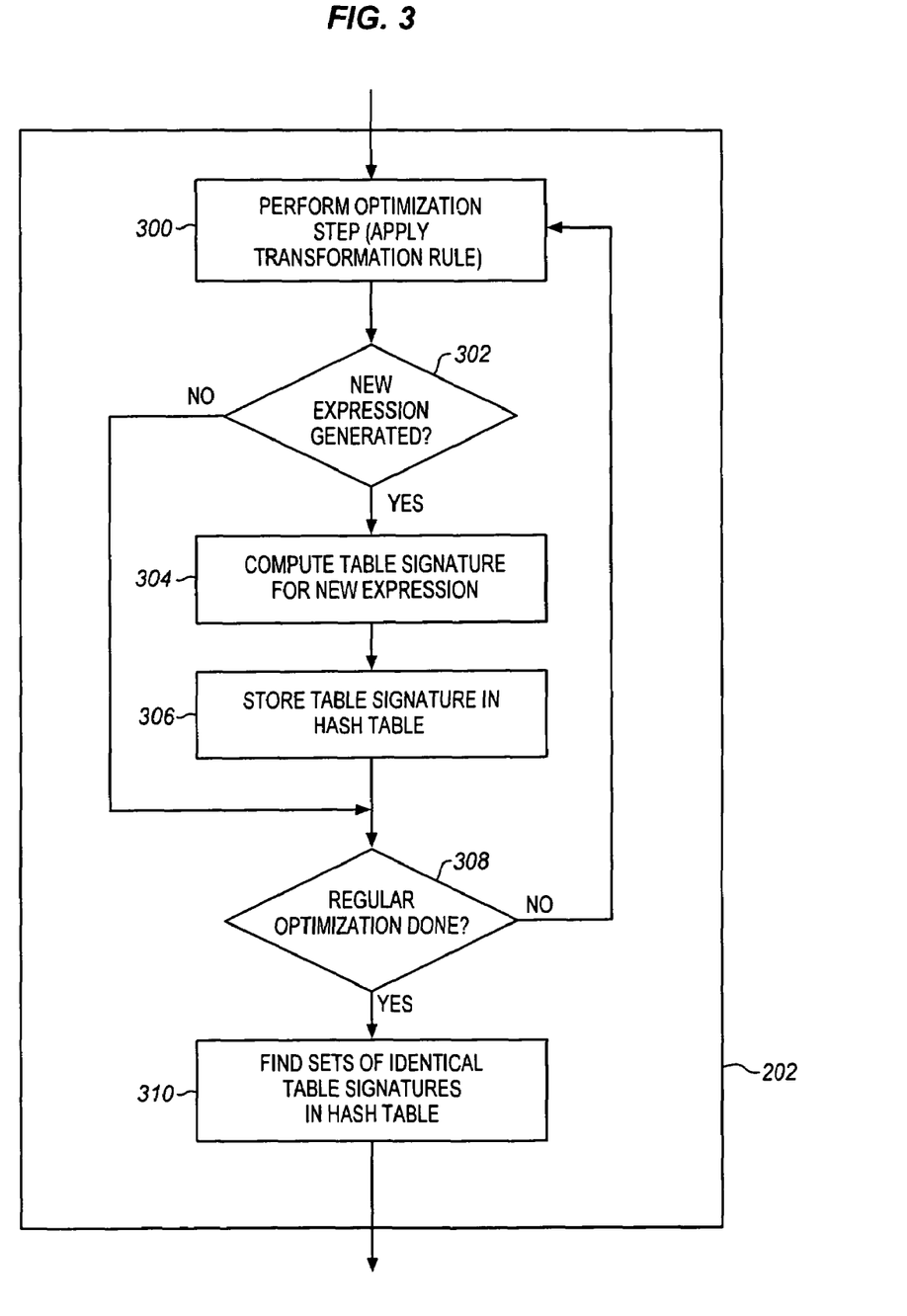
FIGS. 3 through 5 are flowcharts providing exemplary additional details of processing of the method of FIG. 2.

FIG. 3 is a flowchart describing exemplary additional details of the processing of element 200 of FIG. 2 to identify potentially sharable expressions in the one or more received queries. In general, for each expression generated by the optimizer during regular optimization of the received queries, a table signature value is computed. The table signature value includes information required to determine whether two expressions are similar and may potentially share the same transient view. The table signature is a simple structure that may be quickly computed and compared to determine whether the corresponding expressions are similar. The important property of table signatures is that two expressions cannot share a common transient view unless they have the same table signature. Further, as noted above, the computed table signature information may be stored/registered in a hash table structure or other suitable data structure to permit rapid access for purposes of comparing two or more table signatures to determine whether the corresponding may potentially share a transient view.

Element 300 of FIG. 3 depicts an optimization step, consisting of applying a transformation rule, performed during regular optimization of the received queries. Application of a transformation rule may generate a new subexpression. Element 302 tests whether a new expression was generated. It not, processing continues at element 308. If so, element 304 is operable to compute the table signature value for the new expression. An exemplary table signature structure computation is discussed in further detail herein below. An exemplary table signature is any data structure that identifies the source tables involved in the expression and indicates whether the expression includes a "group by" operator. Element 306 stores/registers the table signature information in a hash table data structure maintained by the transient view manager. Processing continues looping back to element 300 until regular optimization terminates. After regular optimization, processing continues at element 310, where the hash table is inspected to locate all sets of identical signatures. Any set of two or more identical table signatures represents a set of potentially sharable expressions.

As noted above, a hash table data structure is but one exemplary structure useful for storing/registering the table signature information to permit rapid access thereto. The hash table structure is also a convenient structure useful for rapidly identifying all expressions that share the same table signature and hence may be able to share a materialized transient view in the later execution of the query. Those of ordinary skill in the art will readily recognize other suitable data structures for storing/registering such information to allow rapid access to identify shared expressions within the query.

A table signature exists for an expression if and only if the expression represents an SPJG expression of the SQL database. An SPJG expression is one that utilizes only select, project, join, and group by SQL operators. Expressions that use any other operators are not currently considered candidates for sharing but those of ordinary skill in the art readily recognize that the approach described herein can be extended to include other types of operators. When a table signature value exists for an expression, it may be represented as a binary tuple $(S_E=[G_E; T_E])$ where $G_E$ is a Boolean value indicating whether the expression E. contains a group by operation, and wherein $T_E$ represents the set of source tables and views of the underlying expression E. When such a table signature value exists for an expression E, it may be computed by traversing the operator tree in post order and at each operator applying the corresponding rule list in the following table

| Operator | | Table Signature |
|---|---|---|
| Table/view | St = | [F; t] |
| Select | $S_{\sigma(E)} =$ | $S_E$ if $G_E$ = F Ø otherwise |

-continued

| Operator | | Table Signature |
|---|---|---|
| Project | $S_{\pi(E)} =$ | $S_E$ if $G_E$ = F Ø otherwise |
| Join | $S_{E1 \times E2} =$ | [F; $T_{E1} \cup T_{E2}$] if $G_{E1} = G_{E2}$ = F Ø otherwise |
| Group-by | $S_{\gamma(E)} =$ | [T; $T_Q$] if GE = F Ø otherwise |
| Other | $S_E =$ | Ø |

A table signature so computed serves as a high level abstraction of an expression to allow rapid detection of potentially sharable expressions. However, the table signature structure and value does not contain detailed information about each expression such as individual predicates and group-by columns. This detailed information is taken into account later when constructing candidate transient views.

Figure 4:
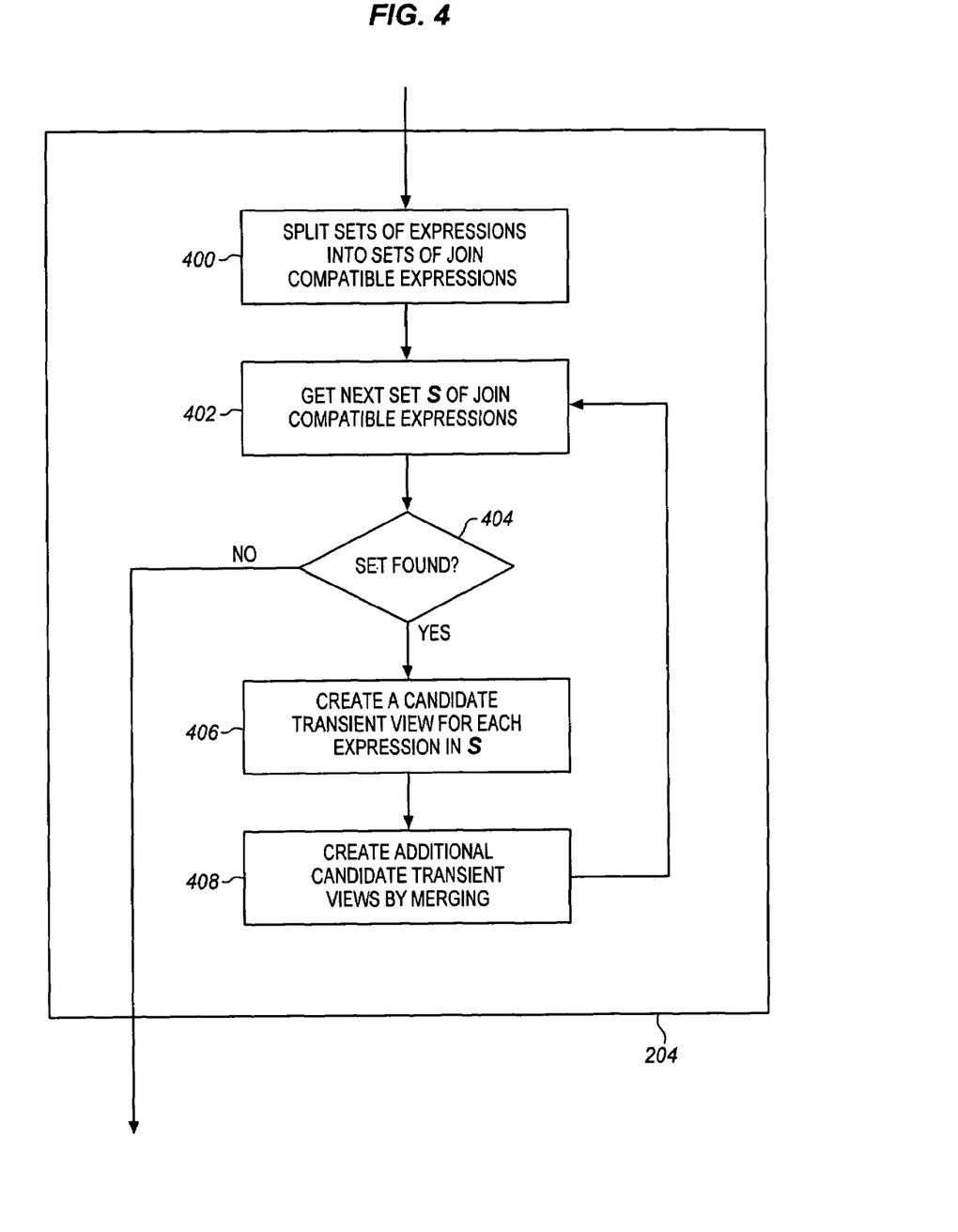

FIG. 4 is a flowchart providing exemplary additional details of the processing of element 204 of FIG. 2. In general, the method of FIG. 4 is operable to generate candidate transient views for a set of potentially sharable expression. The method is repeated for each such set identified in element 202. The expressions in the input set may not be join compatible. If that is the case, Element 400 first splits the input set into smaller sets where all expressions are join compatible. Two expressions are join compatible if they have enough join predicates in common so that a transient view covering both of them does not require a Cartesian product, that is, the view's join graph is connected. Any expression that is not join compatible with any other expressions is discarded. Next the sets of join compatible expressions, if any, are processed one by one. Element 402 gets the next set S of expressions to consider. Element 404 test whether a set to process was found. If not, generation of candidate transient views terminates. If so, candidate view for expressions in set S are generated. Element 406 generates a trivial candidate transient view for each expression in S, that is, a view that exactly matches its target expression. Next, in element 408, additional candidate transient views are generated by repeated pair wise merging of the existing candidates. Each candidate transient view is designed to cover a certain set of expressions, which are referred to as its potential consumers. Merging two candidate transient views means creating a candidate transient view that covers the potential consumers of both input views. The merging process continues until no further merging is possible. After all candidate transient views for set S have been generated, processing continues with element 402.

The above description describes an exhaustive merge process where all possible pair-wise merges are performed. Those with ordinary skill in the art readily recognize that an exhaustive process may be expensive and that a variety of other, more restrictive merge patterns may be utilized instead.

During the process of generating candidate transient candidate views according to the method of FIG. 4, a number of heuristic rules may be applied (not shown) to rapidly eliminate one or more transient view candidates that are unlikely to provide any benefit in processing the query. Exemplary heuristic rules may include the following:

eliminating any transient view candidate for which the estimated total cost of evaluating its potential consumers does not exceed a minimum threshold portion of the estimated total cost for evaluating the query;

eliminating any potential consumer expression from consideration when constructing a candidate transient view if the estimated cost of evaluating the expression without use of the transient view candidate is less than the estimated cost of evaluating the expression by scanning the transient view candidate;

eliminating any transient view candidate wherein the transient view candidate $V_{new}$ represents the merger of two other transient view candidates $V_1$ and $V_2$ and wherein the estimated cost of evaluating the potential consumers using $V_{new}$ is greater than the estimated cost of evaluating them using $V_1$ and $V_2$;

eliminating any transient view candidate wherein the maximum benefit for use of the transient view candidate in evaluating the query does not exceed a minimum threshold portion of the estimated total cost for evaluating the query; and eliminating any transient view candidate if it is contained by a wider view candidate with the same potential consumers and where the result size of the transient view candidate exceeds a minimum threshold portion of the size of the wider candidate. A view $V_1$ is wider than another view $V_2$ if $V_1$ references the same tables as $V_2$ plus at least one additional table.

Those of ordinary skill in the art will readily recognize a variety of other heuristic rules that may be applied to rapidly eliminate one or more transient view candidates. By rapidly eliminating a number of transient view candidates, further query optimization may proceed more rapidly based on a reduced number of transient view candidates to be considered.

By initially pruning the transient view candidates to rapidly eliminate some number of candidate expressions, the duration of the subsequent cost-based optimization may be reduced. If no candidate transient view remains after pruning, the subsequent optimization step is skipped and the best execution plan using no transient views is generated.

Figure 5:
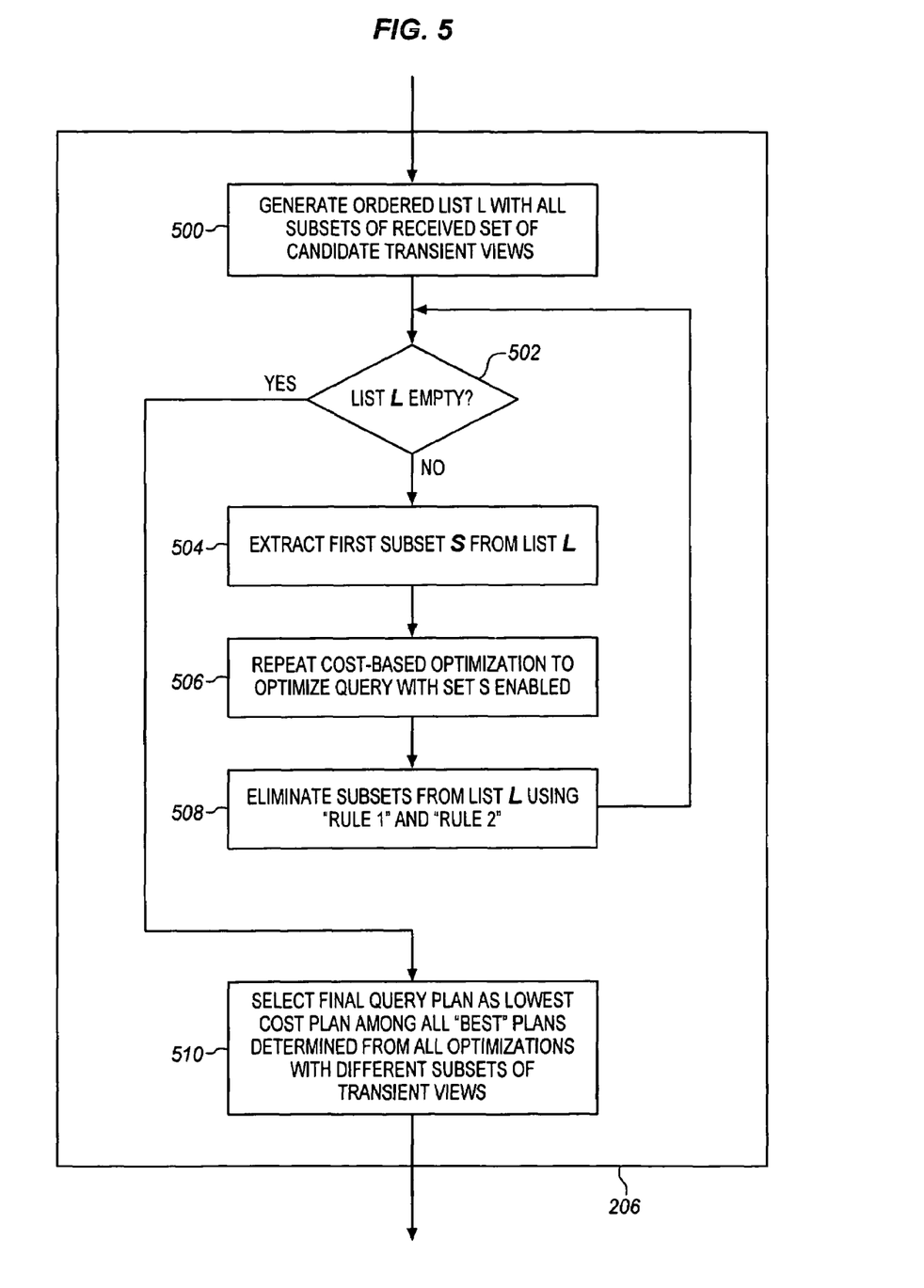

FIG. 5 is a flowchart describing exemplary additional details of the processing of element 206 of FIG. 2. In general, the method of FIG. 5 represents repeated application of cost-based query optimization techniques, at each application, considering different subsets of the remaining transient view candidates. The subsets to be considered in accordance with features and aspects hereof are analyzed in a preferred sequence to further reduce the number of subsets of transient view candidates that need be considered. Each invocation of the cost-based optimization on a particular subset of transient view candidates produces a corresponding best query execution plan that makes use of some or all of the transient view candidates from that particular subset. After repetitive cost-based optimization of some number of possible subsets of transient view candidates, the lowest-cost plan among the various best query execution plans may be selected as the final, optimized query execution plan.

Certain modifications of the normal optimization process are required for correct optimization with transient views. One such modification concerns correctly accounting for the cost for creating and materializing a transient view during execution. The optimization process proceeds bottom-up considering larger and larger subexpressions. When the subexpression representing a transient view has been optimized, the estimated cost of evaluating the expression and storing the results, referred to as its initial cost, is known but it cannot charged at that point nor divided evenly among the consumers because the actual number of consumer is not known. Instead each consumer is only charged the cost of reading the result of the transient view and the initial cost is charged at the least common ancestor of the potential consumers. The least common ancestor of a set T of nodes in an operator tree is the lowest node in the tree that is an ancestor of all nodes in T.

When considering multiple transient view candidates, using a single optimization pass only may produce a less than optimal query execution plan. Because the query optimizer initially charges each consumer only the reading cost for each possible re-use of a transient view, it may wrongly prune out an optimal plan solely based on the reading cost alone, not considering the initial costs for the transient view. The solution in accordance with features and aspects hereof is to trigger optimization multiple times, each time specifying a different subset of transient views that the optimizer is allowed to consider. More specifically, the set of transient views for the optimizer to consider is treated as part of required properties for a particular repetitive invocation of the optimizer. For example, with two transient view candidates (V1 and V2), optimization of the query may be repeated with three different subsets of the transient view candidates, namely [V1, V2], [V1], and [V2]. The optimizer then compares all three query execution plans (along with any plans generated during regular optimization) and chooses the lowest-cost plan.

To blindly repeat optimization processing for all possible subsets would require significantly more processing where the number of transient view candidates is large—e.g. where the number of possible subsets for N transient view candidates would be $O(2^N)$.

In practice, the number of transient view candidates is small resulting in a small number of re-optimizations. The query optimizer typically maintains optimization history which can be exploited to speed up re-optimization processing. Consequently, the overhead of re-optimization is small, compared with initial optimization. Even so, features and aspects hereof can further reduce the number of re-optimization repetitions based on the following two important observations Rule 1: Suppose $S=T\cup R$, $T\cap R=\emptyset$, is a set of candidate transient views such that every candidate transient view in T is independent of all other candidate transient views in S. After the query has been optimized with S enabled, optimization for any set $S_i$ such that $S_i \subset S$, $S_i \cap R=R$ and $S_i \cap T \subset T$ can be skipped.

Rule 2: For each optimization, if the returned optimal plan uses a subset $S^{used}$ of the enabled transient views, the returned plan is optimal also if optimizing with only $S^{used}$ enabled thus optimization with only $S^{used}$ enabled can be skipped At the same time, the optimization as having been done with $S^{used}$ enabled can be skipped and the previous observation applied to eliminate additional combinations.

Two transient views are independent if the least common ancestors of their potential consumers are unrelated, that is, neither one is an ancestor of the other.

Denote the total set of transient views to be considered during optimization with S. Before optimization starts a list L with all possible subsets of S is generated. The list is sorted in decreasing size of the subsets. Transient view cost-based optimizations are started with all transient view candidates enabled, that is, using the first set on list L, and proceeds with the next element of L. After each optimization step, the enabled set is deleted from L and the two observations above are applied to eliminate further elements of L. The process stops when L becomes empty The method of FIG. 5 exploits these important observations to reduce the number of re-optimizations for different subsets of transient view candidates. The input to the method is a set of transient view candidates remaining after step 204. In particular, element 500 of FIG. 5 is operable to generate an ordered list containing all subsets of the set of transient view candidates. The list is sorted in decreasing order of the size of the subsets. Element 502 tests whether list L is empty. If it is, processing proceeds at element 510. If it is not empty, the first subset S is extracted from list L at element 504. At element 506, the query is then re-optimized with subset S enabled and the optimizer generates the best plan that makes use of all, some or none of the transient views in set S. However, the optimizer does not, at this optimization step, consider plans that make use of transient views that are not in set S. At element 508, rules 1 and 2 (see above) are applied to eliminate those subsets from list L that need not be considered and processing proceeds to element 502. When all re-optimization steps have been completed, processing continues with element 510. A plurality of best plans has been determined for each subset of the transient view candidates evaluated by elements of 504 through 508. Each such determined best plan has an associated total cost. Element 510 is operable to determine the final, optimized query execution plan as the lowest-cost plan of all best plans determined by repeated operation of elements 504 through 508.

In the repetitive re-optimizations performed in FIG. 5, historical information retained by most present-day query optimizers may be usefully applied to reduce the computational work required in a re-optimization. Such historical information may include, for example, best solutions (if any) found under certain requirements, cost bounds under certain requirements, lack of any optimization solution under certain requirements, etc. Further optimizations may be realized for particular database programs and applications in accordance with the historical information generated and maintained by the particular systems employed.

Those of ordinary skill in the art will recognize that where the transient view candidates comprise only a single transient view candidate, the method is complete if the first subset (the lone transient view candidate) is not used in the best plan returned at element 506. Further, those of ordinary skill in the art will recognize that such a determination may be made as soon as the least common ancestor node is encountered in traversing the operator tree nodes seeking optimization opportunities for the lone transient view candidate. If no expression can optimally use the sole transient view candidate by the time the least common ancestor node has been traversed in the cost-based optimization traversal of the operator tree then the optimized query execution plan will not include and use of transient views. Rather, the plan optimized in accordance with normal cost based optimization will be used as the final, optimized query execution plan.

Query batches are obvious application for transient view processing features and aspects hereof. They can come from a set of decision-support queries requested by a single user, or from a set of similar queries requested by a group of users. They can also come from queries in a stored procedure.

For complex decision-support queries with uncorrelated sub-queries, sub-queries may be similar to the main query. There are frequently opportunities to exploit similar expressions between the sub-queries and the main query, or among different sub-queries.

A database system may have many similar materialized views. The database system typically maintains each materialized view separately, one after another. There are many opportunities for the optimizer to consider their maintenance plans together and avoid redundant common computation.

While the invention has been illustrated and described in the drawings and foregoing description, such illustration and description is to be considered as exemplary and not restrictive in character. One or more embodiments of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A method of optimizing a database query or batch of queries, the method to be run on a computing system, the method comprising:

identifying sharable subexpressions in a query, wherein the step of identifying comprises:
    determining a table signature associated with each expression of the query, wherein the table signature for a particular expression does not contain individual predicates and group-by columns of the particular expression;
    storing the table signature associated with said each expression; and
    identifying sharable subexpressions as expressions having the same table signature;
generating two or more transient view candidates covering sets of sharable subexpressions;
selecting from among the transient view candidates those candidates that are beneficial for execution of the query, wherein the step of selecting further comprises:
    applying heuristic rules to eliminate one or more of the generated transient view candidates to reduce the set of transient view candidates, wherein the step of applying heuristic rules further comprises:
        applying heuristic rules to eliminate any identified transient view candidates the use of which is not likely to improve execution performance of the optimized query plan, the heuristic rules comprising:
            eliminating any transient view candidate for which the estimated total cost of evaluating its potential consumers does not exceed a minimum threshold portion of the estimated total cost for evaluating the query;
            eliminating any potential consumer expression from consideration when constructing a candidate transient view if the estimated cost of evaluating the expression without use of the transient view candidate is less than the estimated cost of evaluating the expression by scanning the transient view candidate;
            eliminating any transient view candidate wherein a transient view candidate Vnew represents the merger of a first transient view candidate V1 and a second transient view candidate V2 and wherein the estimated cost of evaluating the potential consumers using Vnew is greater than the estimated cost of evaluating them using V1 and V2;
            eliminating any transient view candidate wherein the maximum benefit for use of the transient view candidate in evaluating the query does not exceed a minimum threshold portion of the estimated total cost for evaluating the query; and eliminating any transient view candidate if it is contained by a wider view candidate with the same potential consumers and where the result size of the transient view candidate exceeds a minimum threshold portion of the size of the wider candidate wherein a view V1 is wider than another view V2 if V1 references the same tables as V2 plus at least one additional table; and generating an optimized query execution plan including the selected transient views and including operators to materialize the selected transient views for re-use during execution of the optimized query execution plan.

2. The method of claim 1 wherein the step of storing further comprises storing each table signature in a hash table structure using the table signature to compute a hash table index value.

3. The method of claim 1 wherein the step of selecting further comprises:

repeating cost-based query optimization to select one or more of the identified transient view candidates based on costs associated with each identified transient view candidate to generate the selected transient view candidates for inclusion in the optimized query plan.

4. The method of claim 1 wherein the step of selecting further comprises:

generating an ordered list L containing all subsets of the set of transient view candidates wherein the list is sorted in decreasing order of the size of the subsets;

extracting a first subset S from list L;

re-optimizing the query using cost-based optimization with subset S;

applying a rule to eliminate those subsets from list L that need not be considered; and repeating the steps of extracting, re-optimizing, and applying a rule for all subsets remaining in list L to determine one or more selected transient view candidates for each subset of the transient view candidates evaluated by the re-optimization.

5. The method of claim 1 wherein the one or more identified transient view candidates comprises a plurality of identified transient view candidates, wherein the step of selecting further comprises:

determining through cost-based query optimization analysis a best query execution plan presuming all of the plurality of identified transient view candidates are enabled for substitution cost-based query optimization wherein the best query execution plan so determined uses a first subset of the plurality of identified transient view candidates;

repeating the cost-based analysis to determine other best query execution plans only for other subsets of the plurality of identified transient view candidates where each other subset has at least as many elements as the first subset; and selecting a best query execution plan having lowest estimated cost from among the determined best query execution plans as the optimized query execution.

6. A method of processing an SQL query, the method to be run on a computing system, the method comprising:

identifying sharable expressions in the SQL query as transient view candidates, wherein the step of identifying comprises:

determining a table signature associated with each expression of the query, wherein the table signature for a particular expression does not contain individual predicates and group-by columns of the particular expression;

storing the table signature associated with said each expression; and identifying sharable subexpressions as expressions having the same table signature;

applying heuristic rules to eliminate from further consideration in processing the query any of the identified transient view candidates unlikely to substantially improve execution performance of the SQL query, the heuristic rules comprising:

eliminating any transient view candidate for which the estimated total cost of evaluating its potential consumers does not exceed a minimum threshold portion of the estimated total cost for evaluating the query;

eliminating any potential consumer expression from consideration when constructing a candidate transient view if the estimated cost of evaluating the expression without use of the transient view candidate is less than the estimated cost of evaluating the expression by scanning the transient view candidate;

eliminating any transient view candidate wherein the transient view candidate Vnew represents the merger of a first transient view candidate V1 and a second transient view candidate V2 and wherein the estimated cost of evaluating the potential consumers using Vnew is greater than the estimated cost of evaluating them using V1 and V2;

eliminating any transient view candidate wherein the maximum benefit for use of the transient view candidate in evaluating the query does not exceed a minimum threshold portion of the estimated total cost for evaluating the query; and eliminating any transient view candidate if it is contained by a wider view candidate with the same potential consumers and where the result size of the transient view candidate exceeds a minimum threshold portion of the size of the wider candidate wherein a view V1 is wider than another view V2 if V1 references the same tables as V2 plus at least one additional table;

performing cost-based query optimization estimating the cost of each of one or more subsets of the identified transient view candidates to generate a final query plan including any remaining identified transient view candidates after application of the one or more heuristic rules; and executing the final query plan including the step of materializing the remaining identified transient view candidates for re-use while executing the final query plan.

7. The method of claim 6 wherein the step of identifying further comprises:

computing a table signature value associated with each expression; and identifying two or more expressions having equal table signature values as sharable expressions.

8. The method of claim 6 wherein the step of performing cost-based query optimization further comprises:

determining an initial cost for each of the identified transient view candidates wherein the initial cost of a identified transient view candidate includes a cost of computing the identified transient view candidate and includes a cost of writing the identified transient view candidate;

representing the query as an operator tree where each node of the operator tree comprises either a source table or an operation node representing a view formed by an operator applied to one or more other views or source tables represented as child nodes of the node;

determining the final query plan by determining the lowest estimated cost query plan including any subset of the set of identified transient view candidates where the step of determining evaluates less than all identified subset of the set of all identified transient view candidates.

9. The method of claim 6
wherein the step of applying heuristics further comprises:
generating an ordered list L containing all subsets of the set of transient view candidates wherein the list is sorted in decreasing order of the size of the subsets;
extracting a first subset S from list L;
re-optimizing the query using cost-based optimization with subset S;
applying a rule to eliminate those subsets from list L that need not be considered; and
repeating the steps of extracting, re-optimizing, and applying a rule for all subsets remaining in list L to determine zero or more selected transient view candidates for each subset of the transient view candidates evaluated by the re-optimization.

10. A database query processing system comprising:
a persistent data store;
a query compiler adapted to receive one or more query and adapted to translate the received query into an operator tree including views and operators representing the received query;
a transient view manager adapted to store information regarding identified transient views; and
a query optimizer coupled to receive the operator tree from the query compiler and coupled to exchange information regarding identified transient views with the transient view manager, the query optimizer adapted to generate a query execution plan including zero or more identified transient views to perform the received query on the persistent data store, wherein the query optimizer is adapted to identify common transient view that may be beneficially materialized to optimize execution of the query by heuristically eliminating any transient views that are not likely to be beneficial to query optimization by applying heuristic rules to eliminate one or more of the generated transient view candidates to reduce the set of transient view candidates, wherein applying heuristic rules further comprises:
  applying heuristic rules to eliminate any identified transient view candidates the use of which is not likely to improve execution performance of the optimized query plan, the heuristic rules comprising:
    eliminating any transient view candidate for which the estimated total cost of evaluating its potential consumers does not exceed a minimum threshold portion of the estimated total cost for evaluating the query;
    eliminating any potential consumer expression from consideration when constructing a candidate transient view if the estimated cost of evaluating the expression without use of the transient view candidate is less than the estimated cost of evaluating the expression by scanning the transient view candidate;
    eliminating any transient view candidate wherein a transient view candidate Vnew represents the merger of a first transient view candidate V1 and a second transient view candidate V2 and wherein the estimated cost of evaluating the potential consumers using Vnew is greater than the estimated cost of evaluating them using V1 and V2;
    eliminating any transient view candidate wherein the maximum benefit for use of the transient view candidate in evaluating the query does not exceed a minimum threshold portion of the estimated total cost for evaluating the query; and
    eliminating any transient view candidate if it is contained by a wider view candidate with the same potential consumers and where the result size of the transient view candidate exceeds a minimum threshold portion of the size of the wider candidate wherein a view V1 is wider than another view V2 if V1 references the same tables as V2 plus at least one additional table,
wherein the query optimizer is adapted to compute a table signature for each identified transient view, wherein the table signature for a particular expression does not contain individual predicates and group-by columns of the particular expression, and the query optimizer is adapted to store the table signature in cooperation with the transient view manager wherein the table signature identifies the source tables in the transient view.

11. The system of claim 10
wherein the query optimizer is adapted to identify common transient views used in the query that may be materialized to optimize execution of the query.

12. The system of claim 11
wherein the query optimizer is adapted to identify common transient view that may be most beneficially materialized to optimize execution of the query by estimating costs of each transient view and by evaluating the reduction in query execution cost by evaluating subsets of the set of all common transient views.

* * * * *